US010913426B2

(12) United States Patent
Zhao et al.

(10) Patent No.: US 10,913,426 B2
(45) Date of Patent: Feb. 9, 2021

(54) AUTOMOBILE, STEERING WHEEL, AND DRIVER IDENTITY RECOGNITION METHOD (71) Applicant: HUAWEI TECHNOLOGIES CO., LTD., Guangdong (CN)

(72) Inventors: Xinyu Zhao, Shenzhen (CN); Heshuai Si, Shenzhen (CN); Chengping Liu, Dongguan (CN); Yunzhe Chen, Shenzhen (CN); Zeshi Zhang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/457,424

(22) Filed: Jun. 28, 2019

(65) Prior Publication Data

US 2019/0337484 A1 Nov. 7, 2019

Related U.S. Application Data (63) Continuation of application No. PCT/CN2017/118651, filed on Dec. 26, 2017.

(30) Foreign Application Priority Data

Dec. 30, 2016 (CN) .......................... 2016 1 1253513

(51) Int. Cl.
*B60R 25/25* (2013.01)
*B62D 1/04* (2006.01)
(Continued)

(52) U.S. Cl.
CPC .............. *B60R 25/25* (2013.01); *B62D 1/046* (2013.01); *G06F 21/32* (2013.01); *G07C 9/25* (2020.01)

(58) Field of Classification Search
None
See application file for complete search history.

(56) References Cited

U.S. PATENT DOCUMENTS 6,724,689 B2   4/2004   Koenig
6,844,660 B2 * 1/2005   Scott ................... G06K 9/0002
                                                310/328

(Continued)

FOREIGN PATENT DOCUMENTS

CN          101055193 A       10/2007
CN          102958756 A        3/2013
(Continued)

*Primary Examiner* — K. Wong
(74) *Attorney, Agent, or Firm* — Womble Bond Dickinson (US) LLP (57) ABSTRACT Embodiments of the present invention provide an automobile including a processor and a sensing apparatus, and the sensing apparatus is installed on a part that is of the automobile and that may be in contact with a hand of a driver, and includes a transmitter and a receiver. The transmitter sends a sound wave signal to the hand of the driver, and the receiver receives a reflected sound wave signal reflected by the hand of the driver, converts the reflected sound wave signal to an electrical signal, and sends the electrical signal to the processor. The processor analyzes the electrical signal to obtain a feature of the reflected sound wave signal, and recognizes an identity of the driver based on the feature of the reflected sound wave signal.

14 Claims, 10 Drawing Sheets (51) Int. Cl.
  *G06F 21/32* (2013.01)
  *G07C 9/25* (2020.01)

(56) References Cited

U.S. PATENT DOCUMENTS

| | | | |
|---|---|---|---|
| 7,760,918 B2* | 7/2010 | Bezvershenko | A61B 5/1171 |
| | | | 382/115 |
| 9,292,093 B2 | 3/2016 | Iao | |
| 9,405,892 B2* | 8/2016 | Baldwin | G06F 21/32 |
| 2006/0284839 A1* | 12/2006 | Breed | B62D 1/046 |
| | | | 345/156 |
| 2011/0121958 A1 | 5/2011 | Wäller et al. | |
| 2013/0090807 A1 | 4/2013 | Kojima et al. | |
| 2015/0032322 A1 | 1/2015 | Wimmer et al. | |
| 2015/0066245 A1 | 3/2015 | Lee et al. | |
| 2016/0101783 A1 | 4/2016 | Abou-Nasr et al. | |
| 2016/0132126 A1 | 5/2016 | Van Laack et al. | |
| 2016/0311400 A1 | 10/2016 | Gennermann | |

FOREIGN PATENT DOCUMENTS

| | | |
|---|---|---|
| CN | 203854614 U | 10/2014 |
| CN | 104245392 A | 12/2014 |
| CN | 104276201 A | 1/2015 |
| CN | 104554147 A | 4/2015 |
| CN | 204367992 U | 6/2015 |
| CN | 204399106 U | 6/2015 |
| CN | 101970258 B | 7/2015 |
| CN | 204821403 U | 12/2015 |
| CN | 105584368 A | 5/2016 |
| CN | 105607770 A | 5/2016 |
| CN | 105752031 A | 7/2016 |
| CN | 105829174 A | 8/2016 |
| CN | 205440280 U | 8/2016 |
| CN | 106218586 A | 12/2016 |
| DE | 19922004 A1 | 11/2000 |
| JP | H11221203 A | 8/1999 |
| JP | 2007076631 A | 3/2007 |
| JP | 2009254584 A | 11/2009 |
| JP | 2010110380 A | 5/2010 |
| JP | 4475288 B2 | 6/2010 |
| JP | 2012533474 A | 12/2012 |
| JP | 2014200681 A | 10/2014 |
| WO | 9927489 A1 | 6/1999 |
| WO | 2016204968 A1 | 12/2016 |

* cited by examiner

AUTOMOBILE, STEERING WHEEL, AND DRIVER IDENTITY RECOGNITION METHOD

CROSS-REFERENCE TO RELATED APPLICATIONS

This application is a continuation of International Application No. PCT/CN2017/118651, filed on Dec. 26, 2017, which claims priority to Chinese Patent Application 201611253513.9, filed on Dec. 30, 2016. The disclosures of the aforementioned applications are hereby incorporated by reference in their entireties.

TECHNICAL FIELD

This application relates to an identity recognition technology, and in particular, to a driver identity recognition method based on a sound wave, and a steering wheel or an automobile to which the method is applied.

BACKGROUND

In recent years, an automobile safety standard has been continuously improved, and requirements of people for automobile driving safety are also continuously increasing. With development of automobile electronization and intelligentization, a plurality of technologies used for driver identity recognition have emerged. For example, an iris sensing apparatus is installed on an automobile, and a driver identity is recognized and verified by using an iris recognition technology. However, the iris recognition technology imposes a relatively strict requirement on an environment and an action of a driver, and if the driver is wearing glasses for myopia, sunglasses, or a hat, or if an eye of the driver is not aligned with the iris sensing apparatus, it is quite difficult to accurately recognize a driver identity. Therefore, when the iris recognition technology is used, the driver needs to perform some special actions during identity recognition, and consequently relatively poor experience is caused.

SUMMARY

Embodiments of the present invention provide an automobile. A sensing apparatus and a processor are installed on the automobile, where the sensing apparatus is installed on a part that is of the automobile and that may be in contact with a hand of a driver, for example, a steering wheel, a door handle, a brake lever, a vicinity of a keyhole, or a vicinity of a center console panel near the driver. The sensing apparatus obtains a feature of the hand of the driver (which may be specifically a feature of a hand bone) based on a sound wave, to recognize and verify an identity of the driver.

The sensing apparatus includes a transmitter and a receiver, where the transmitter is configured to send a sound wave signal to the hand of the driver when the hand of the driver is in contact with the sensing apparatus, and the receiver is configured to: receive a reflected sound wave signal reflected by the hand of the driver, convert the reflected sound wave signal to an electrical signal, and send the electrical signal to the processor. The processor analyzes the electrical signal to obtain a feature of the reflected sound wave signal, and recognizes an identity of the driver based on the feature of the reflected sound wave signal.

In embodiments, the processor analyzes the electrical signal to obtain the feature of the reflected sound wave signal, where the feature of the reflected sound wave signal indicates a feature of the hand of the driver; compares the obtained feature of the reflected sound wave signal with a pre-stored feature of the hand of the driver; and determines the identity of the driver based on the comparison result. After the identity of the driver is determined, an operation performed on the automobile may be determined based on the identity of the driver, for example, driving attribute configuration of the automobile.

Herein, the pre-stored feature of the hand of the driver may be a feature that is of a reflected sound wave signal and that is collected by the sensing apparatus by using a method similar to the foregoing method when the driver drives the automobile for the first time, and features of one or more drivers may be stored.

The electrical signal is classified into a digital signal and an analog signal. In some embodiments, a codec (or another apparatus having a same function) is further installed on the automobile, where the codec encodes the electrical signal sent by the receiver into a digital signal, and sends the digital signal to the processor. In this way, the electrical signal received by the processor is in a form of a digital signal, and the electrical signal may be processed more flexibly.

According to the automobile on which the sensing apparatus and the processor are installed, feature information of the hand of the driver can be conveniently obtained without requiring the driver to remove glasses, sunglasses, or a hat or to perform a special action for identity recognition; and the identity of the driver can be recognized based on the feature information of the hand of the driver. Therefore, identity recognition experience of the driver is improved.

In some embodiments, when the sensing apparatus is installed on a steering wheel, one sensing apparatus may be installed on one steering wheel. The sensing apparatus may be installed on a position with which the driver is most likely to be in contact while driving the automobile, for example, an outer side of the steering wheel. The steering wheel is usually circular. A specific installing position may be determined based on a driving habit of the driver.

In some other embodiments, when the sensing apparatus is installed on a steering wheel, a plurality of sensing apparatuses may be installed on one steering wheel, for example, 2, 3, 4, or more. Specifically, the plurality of sensing apparatuses may be evenly arranged around an outer side of the steering wheel, and a spacing between any two sensing apparatuses is less than or equal to a preset palm width (or length). In this way, it may ensure as far as possible that the driver may be in contact with at least one sensing apparatus when being casually in contact with the steering wheel, increasing a possibility of collecting a feature of the hand, and improving convenience of using the recognition method. The preset palm width herein may be a minimum value or an average value obtained by collecting and comparing palm widths of a plurality of persons, or may be set in an estimation manner, for example, a palm width of a man or woman over eighteen years old who may obtain a driving qualification is generally not less than four centimeters. Therefore, the preset palm width is set to four centimeters or less.

When the sensing apparatus is installed on a door handle, a brake lever, or another position, deployment manners of the sensing apparatus and the steering wheel may be different, but a quantity of sensing apparatuses and a specific position of the sensing apparatus may be determined based on an actual situation. This is not limited in the present invention.

In some embodiments, the sensing apparatus may further include a shock-absorbing component, and the shock-absorbing component may be disposed between the transmitter and a part (such as the steering wheel) on which the sensing apparatus is installed, for example, a rubber pad is disposed between the transmitter and the steering wheel. A position relationship between the shock-absorbing component and the transmitter may be related to a material or a form of the shock-absorbing component, and the shock-absorbing component can reduce a sound wave signal transmitted by the transmitter to a rigid area of the steering wheel or another parts. Due to introduction of the shock-absorbing component, sound wave signals sent by the transmitter may be transmitted to the hand of the driver as many as possible. Therefore, the reflected sound wave signal of the hand of the driver is obtained more effectively.

In some embodiments, the processor and the sensing apparatus may be installed in a same automobile, for example, installed on a central shaft of a steering wheel of the automobile, while the sensing apparatus may be installed in a position, that is relatively near to the processor, on the steering wheel, for example, outer side of the steering wheel or a surface of the central shaft of the steering wheel. In this way, a signal transmission distance can be reduced, and a signal loss can be reduced.

In some other embodiments, the processor may be deployed in a server, for example, a cloud server. Identity information, obtained from the automobile, of the driver is sent to a cloud, and a cloud processor performs centralized processing to verify the identity of the driver, and returns a verification result to the automobile. In this implementation, a communication connection between the cloud processor and the automobile is further required, for example, a wireless communication connection.

In some embodiments, the processor provided in this embodiment of the present invention may be a processor that is specially used for driver identity recognition. In some other implementations, the processor provided in this embodiment of the present invention may be a processor of an in-vehicle system. In other words, there is no need to add an extra processor alone for driver identity recognition. If the automobile has an in-vehicle system, an original processor of the in-vehicle system is used to implement an identity recognition function provided by this embodiment of the present invention.

An embodiment of the present invention further provides a driver identity recognition method, and the method is applied to one or more sensing apparatuses installed on an automobile. The sensing apparatus is installed on a part that is in contact with a hand of a driver when the diver is readying to drive or driving. When the hand of the driver is in contact with the sensing apparatus, a transmitter of the sensing apparatus sends a sound wave signal to the hand of the driver, and a receiver of the sensing apparatus receives a reflected sound wave signal reflected by the hand of the driver, converts the reflected sound wave signal to an electrical signal, and sends the electrical signal to one or more processors. The one or more processors analyze the electrical signal to obtain a feature of the reflected sound wave signal, and recognize an identity of the driver based on the feature of the reflected sound wave signal. Specifically, the one or more processors may be deployed on the automobile, or may be deployed on one or more central servers.

By using this method, feature information of the hand of the driver can be conveniently obtained, without requiring the driver to perform a special action, and the identity of the driver can be recognized based on the feature information of the hand of the driver. Therefore, identity recognition experience of the driver is improved.

BRIEF DESCRIPTION OF DRAWINGS

To describe technical solutions in embodiments of the present invention more clearly, the following briefly describes the accompanying drawings required in the embodiments of the present invention.

DESCRIPTION OF EMBODIMENTS

With reference to accompanying drawings in the embodiments of the present invention, the following clearly describes the technical solutions provided in the embodiments of the present invention.

Figure 1A:
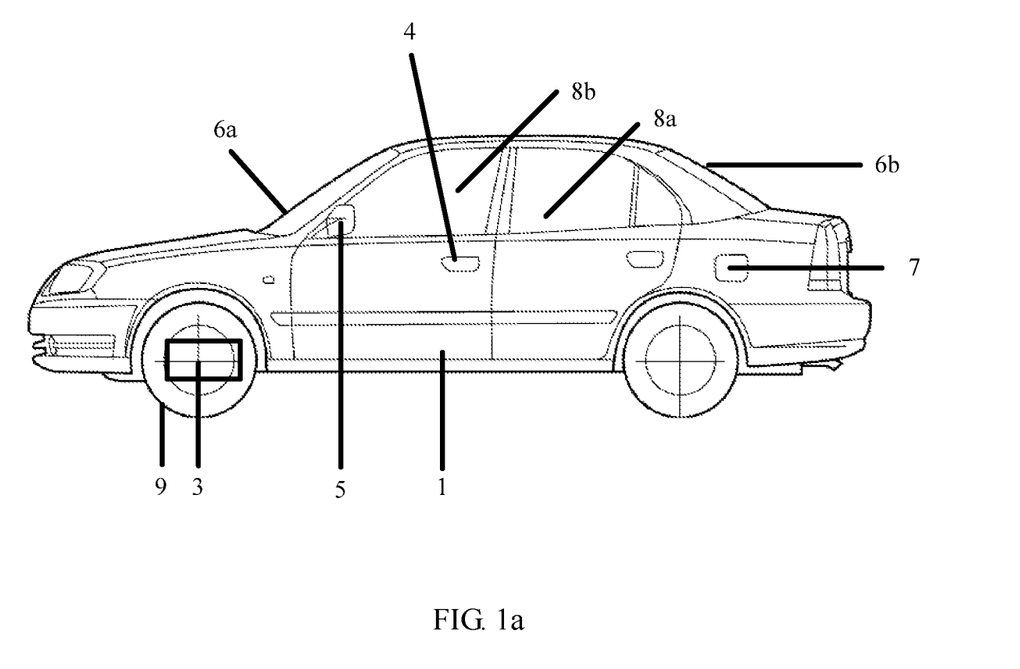
FIG. 1a and FIG. 1b are schematic diagrams of an external structure and an internal structure of an automobile according to an embodiment of the present invention.
Figure 1B:
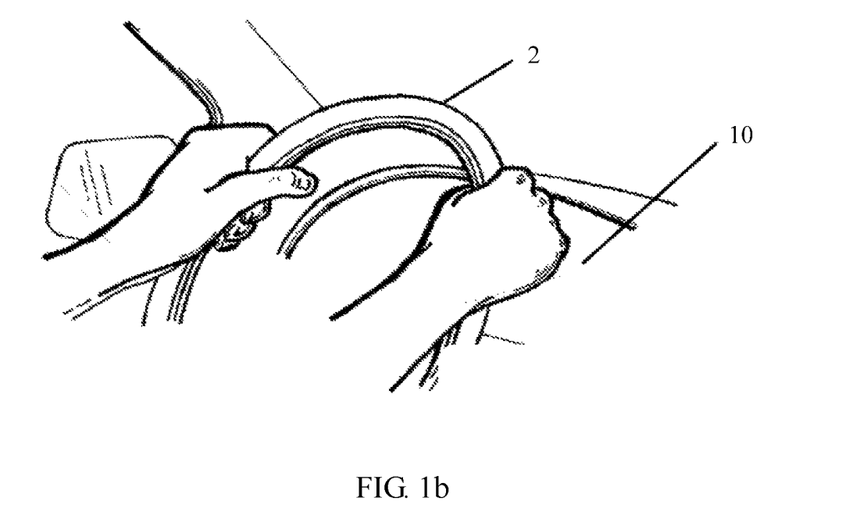

FIG. 1a and FIG. 1b are schematic diagrams of a body structure of an automobile according to an embodiment of the present invention. Visible external parts of the automobile usually include an automobile door 1, an automobile wheel axle 3, a tire 9, a refueling inlet 7, a front windshield 6a, a rear windshield 6b, a door handle 4, side glass 8a and 8b, and the like. After the automobile door is opened, a steering wheel 2, a center console 10, and a brake lever, a brake, and an accelerator that are not shown can also be seen.

It should be noted that, the steering wheel 2 shown in FIG. 1b is only an example herein, and the steering wheel 2 may further include parts such as a central shaft and a connection between the central shaft and a circular outer side. Function modules such as an indicator light and a dial indicator that are included in the center console 10 have little association with this embodiment of the present invention and are also not shown.

The steering wheel 2 of the automobile provided by this embodiment of the present invention is provided with a sensing apparatus used for recognizing driver identity information. The sensing apparatus detects a feature of a hand bone of a driver by sending out a sound wave signal, so as to recognize an identity of a driver.

Figure 1C:
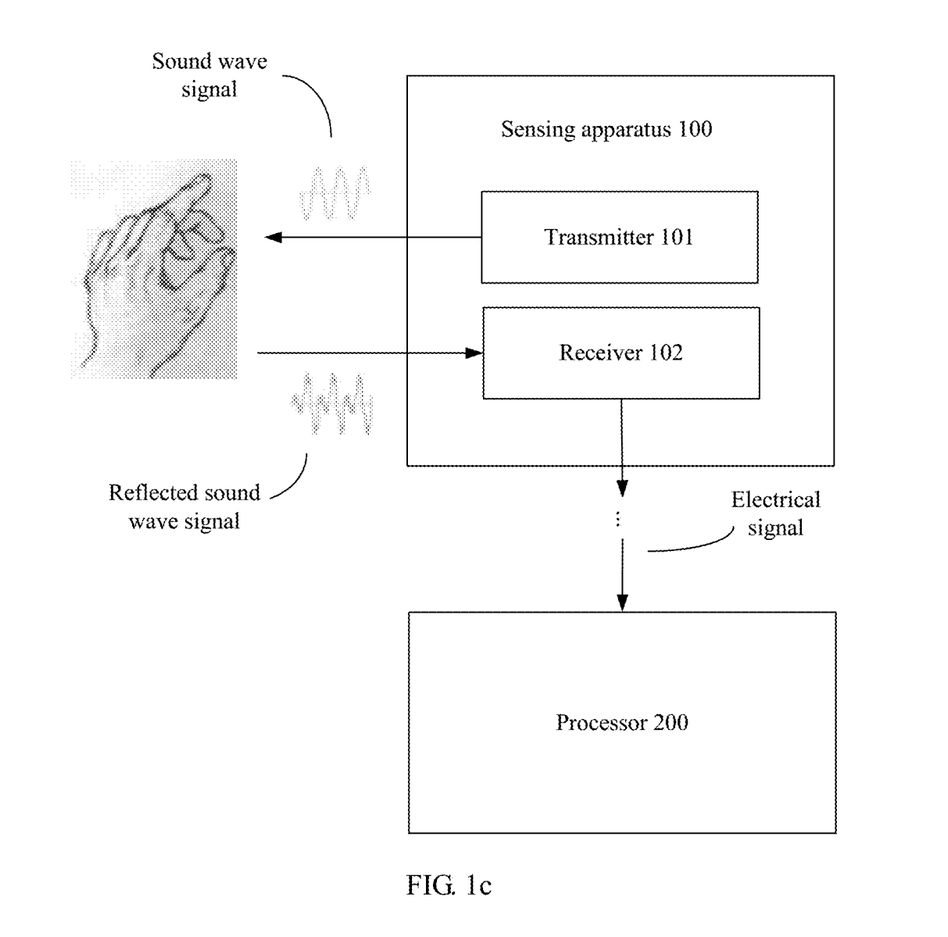
FIG. 1c is a schematic logical structural diagram of an identity recognition apparatus on an automobile according to an embodiment of the present invention.

Specifically, as shown in FIG. 1c, the sensing apparatus 100 includes a receiver 102 and a transmitter 101. The transmitter 101 is configured to send a sound wave signal to a hand of the driver, and the receiver 102 is configured to: receive a reflected sound wave signal reflected by the hand of the driver, convert the reflected sound wave signal to an electrical signal, and send the electrical signal to a processor 200, so that the processor 200 can analyze the electrical signal to obtain a feature of the reflected sound wave signal, and recognize an identity of the driver based on the feature of the reflected sound wave signal.

Figure 2:
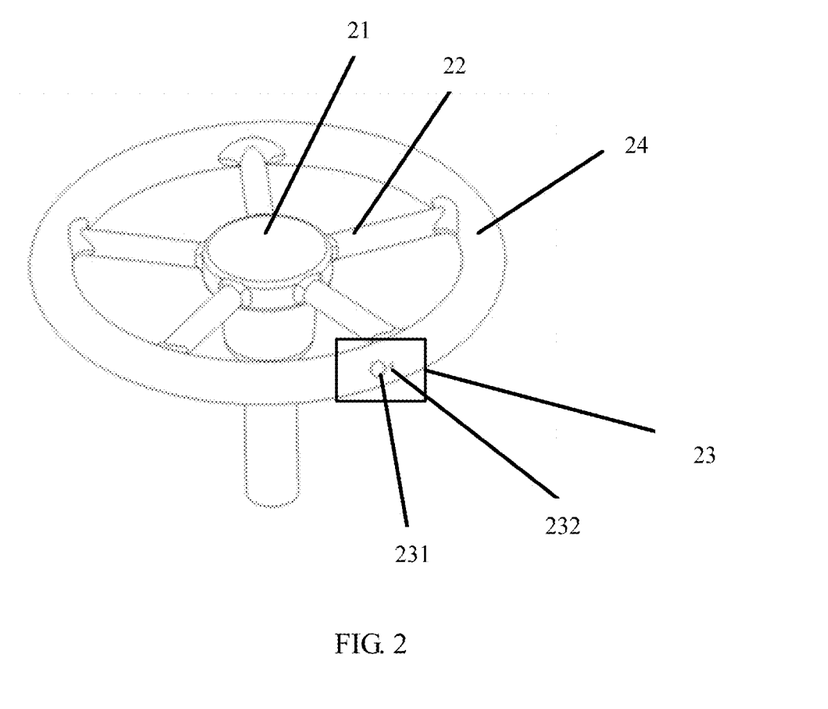
FIG. 2 is a schematic structural diagram of a steering wheel according to an embodiment of the present invention.

FIG. 2 is a specific schematic structural diagram of a steering wheel 2. The steering wheel includes a central shaft 21, a circular outer side 24, five connections 22 between the central shaft and the circular outer side, and a sensing apparatus 23 used for recognizing driver identity information. There is one sensing apparatus 23, and the sensing apparatus is on the circular outer side 24 of the steering wheel. The sensing apparatus 23 includes a bone conduction vibrator 231 and a microphone (MIC) 232.

It should be noted that a quantity and a shape of connections between a central shaft and a circular outer side of one type of steering wheel are different from that of another type of steering wheel. FIG. 2 is only an example for description.

Alternatively, there may be two sensing apparatuses 23, and the sensing apparatuses may be distributed on left and right sides of the circular outer side existing when the steering wheel is in a center position, for example, positions shown in FIG. 1b in which a right and left hand of the driver are placed. There may alternatively be three or more sensing apparatuses 23.

Figure 3:
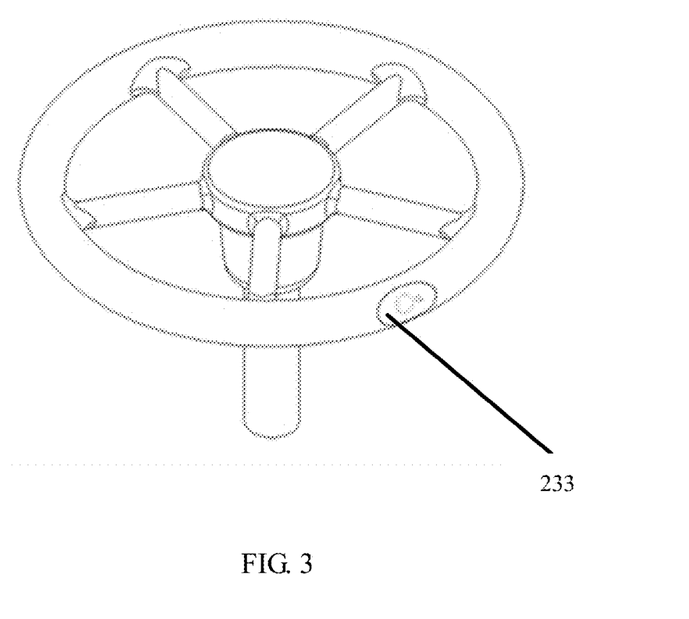
FIG. 3 is a schematic structural diagram of a steering wheel according to another embodiment of the present invention.

As shown in FIG. 3, a bone conduction vibrator 231 and a microphone 232 may be combined under a same piece of rubber 233. The rubber 233 is used as a specific example of a soft rubber structural member, and may reduce vibration transmitted by the bone conduction vibrator 231 to a rigid area of the steering wheel, and improve signal transmission efficiency of the bone conduction vibrator.

Figure 4:
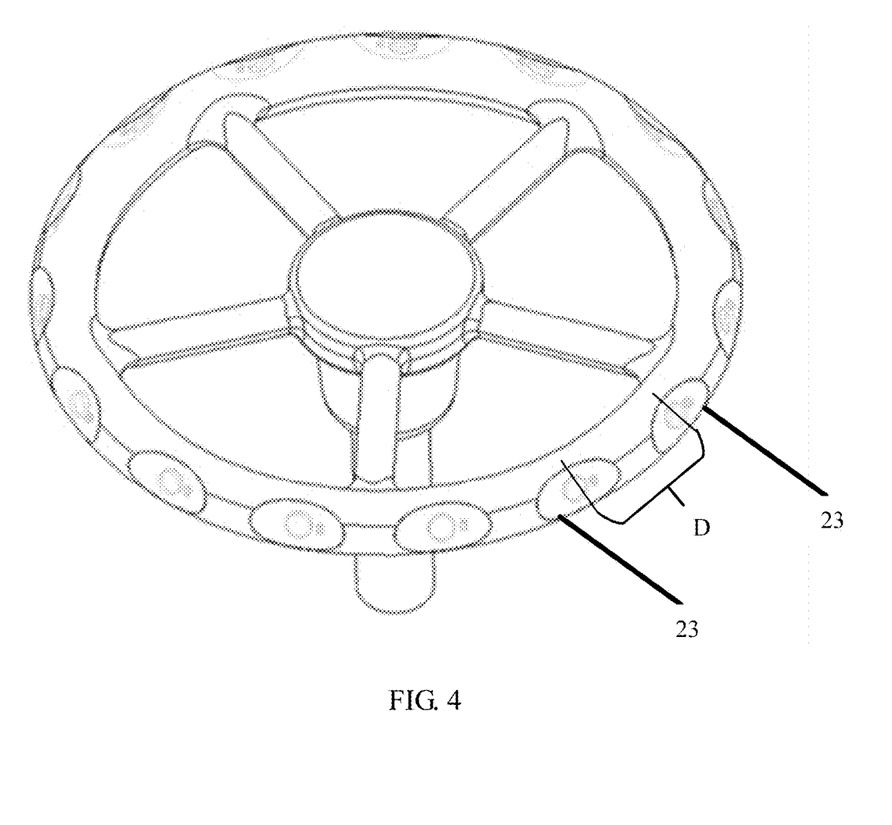
FIG. 4 is a schematic structural diagram of a steering wheel according to still another embodiment of the present invention.

To improve user experience of a driver, hand information of the driver can be recognized when the driver places both hands casually, for example, a case shown in FIG. 4 in which a plurality of sensing apparatuses 23 may be evenly arranged on a circular outer side of a steering wheel of an automobile. Even arrangement herein means that distances between any two adjacent sensing apparatuses 23 are equal or approximately equal. Certainly, in another embodiment, the plurality of sensing apparatuses 23 may be unevenly arranged.

To ensure that one hand of the driver can cover at least one sensing apparatus 23 when the hands of the driver casually grasp the steering wheel, in this embodiment of the present invention, a spacing D between any two adjacent sensing apparatuses is a value less than or equal to an average width of palms of adults (over eighteen years old). In some other embodiments, a minimum width of palms of a plurality of adults may be obtained in a sampling manner, and the spacing D is set to a value less or equal the minimum width of the palms of the adults.

It should be noted that, the spacing between any two adjacent sensing apparatuses 23 in this embodiment of the present invention is a length of an arc of an outer side of the steering wheel between center points of the any two adjacent sensing apparatuses 23. In another embodiment, the spacing D may alternatively be defined as a linear distance between the center points, or a length of an arc or a linear distance between adjacent edges of any two adjacent sensing apparatuses 23.

Figure 5:
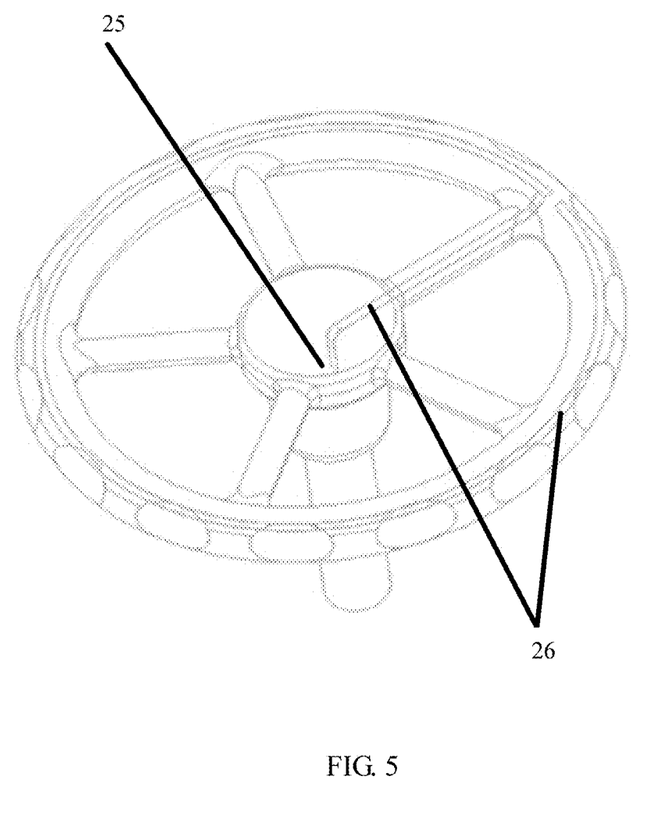
FIG. 5 is a schematic diagram of internal wiring of a steering wheel according to an embodiment of the present invention.

As shown in FIG. 5, a bone conduction vibrator 231 is connected to a microphone 232 by using a flexible printed circuit (FPC) 26, and a signal received by the microphone 232 is transmitted, by using the FPC, to a processor 25 (inside a central shaft of a steering wheel and not shown) included in the central shaft. When a hand of a driver is placed on the steering wheel, the bone conduction vibrator 231 generates a signal, and the signal is reflected after passing through a hand bone of the driver. The microphone 232 collects the reflected signal that includes feature (such as bone density) information of the hand bone, converts the reflected signal to an electrical signal, and transmits the electrical signal to the processor 25. The processor 25 determines an identity of the driver by processing the electrical signal, and determines, based on the identity of the driver, whether an automobile can be started, or further sets a parameter of a device in the automobile based on the identity of the driver.

The processor 25 may be a microprocessor or a coprocessor specially configured to process the electrical signal for completing driver identity recognition, for example, Micro-controller Unit (MCU); or the processor may be a processor of an in-vehicle system included in the automobile, for example, the processor of the in-vehicle system has both driver identity recognition functionality, as discussed herein, and processing functionality of the in-vehicle system.

Figure 6:
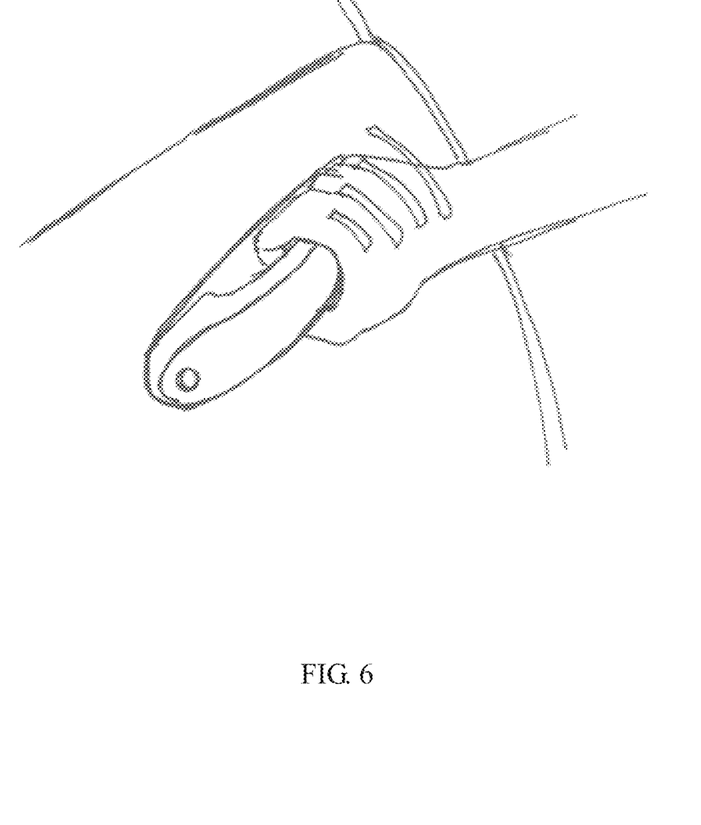
FIG. 6 is a schematic diagram of a door handle of an automobile according to another embodiment of the present invention.

As shown in FIG. 6, in addition to being deployed on a steering wheel of an automobile, the sensing apparatus 23 may be deployed on a door handle of the automobile, for example, the door handle 4 in FIG. 1a. In this way, driver identity recognition may be implemented before an automobile door is opened, and when identity verification fails, it is not allowed to open the automobile door, for example, by controlling locking of the automobile or an alarm, thereby achieving a specific anti-theft function. There may be one or more sensing apparatuses deployed on the door handle of the automobile. In some other embodiments, the sensing apparatus 23 may alternatively be deployed on a brake lever, nearby a keyhole, nearby a center console panel near a driver, and the like.

The foregoing provides specific embodiments of how the driver identity recognition apparatus (including the sensing apparatus and the processor) provided in the embodiments of the present invention is deployed on the automobile. The following describes a specific implementation of a driver identity recognition method provided in the embodiments of the present invention.

Figure 7:
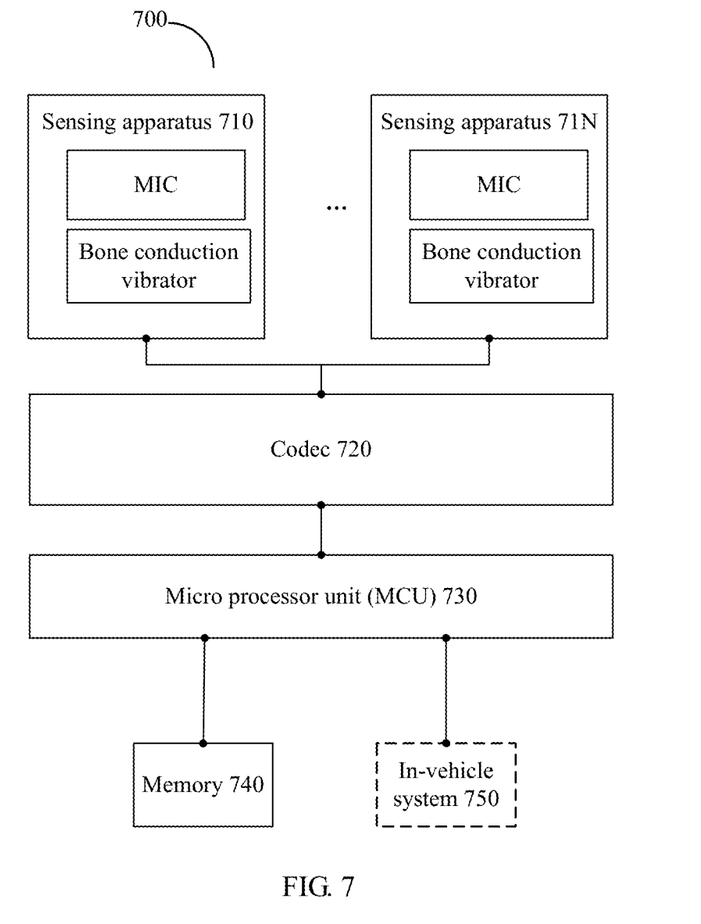
FIG. 7 is a schematic logical structural diagram of an identity recognition apparatus according to an embodiment of the present invention.

Before steps of a specific method are described, refer to FIG. 7. FIG. 7 is a schematic diagram of a logical relationship between components of an identity recognition apparatus 700. The identity recognition apparatus 700 includes sensing apparatuses 710 to 71N, where N is an integer greater than or equal to 2. Each sensing apparatus includes at least one MIC and at least one bone conduction vibrator. A codec 720 is connected to the foregoing plurality of sensing apparatuses, and the codec 720 is connected to an MCU 730. The identity recognition apparatus further includes a memory 740. The memory 740 may be disposed independently, or integrated on the MCU 730; or there are both a memory that is disposed in an integrated manner and a memory that is disposed independently. The memory 740 is configured to store data and a computer program, where the data includes feature information, collected previously, of a hand of a user, and the computer program includes a software program for a digital signal processing method described in the following. In addition, the identity recognition apparatus 700 may further include an in-vehicle system 750, and a specific module of an in-vehicle system 750 is not limited in this embodiment of the present invention.

Figure 8:
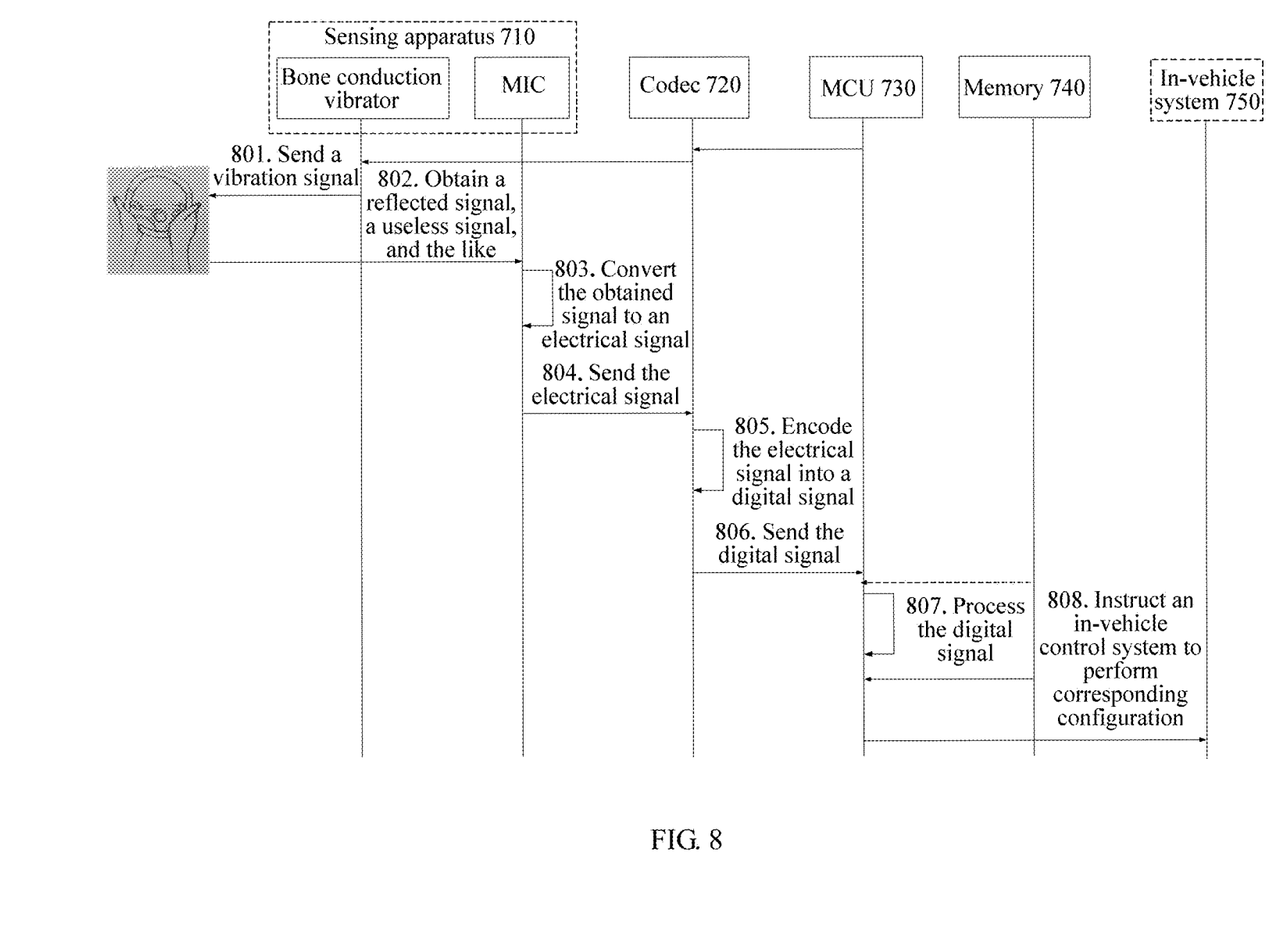
FIG. 8 is a time sequence chart of an identity recognition method according to an embodiment of the present invention.

As shown in FIG. 8, an MCU 730 controls a codec 720 to send a standard signal source to a bone conduction vibrator, and the bone conduction vibrator sends a vibration signal to a hand of a driver, that is, vibrate a hand bone (801). A MIC of the sensing apparatus 710 collects a signal reflected by the hand bone (802) and converts the signal to an electrical signal (803), and then sends the electrical signal to the codec 720 (804). The codec 720 converts the electrical signal to a digital signal (805) and sends the digital signal to the MCU 730 (806). The MCU 730 extracts a feature value of the hand bone of the current driver through digital signal processing (807), and compares the feature value with a feature value, stored in the memory 740, of a hand bone of a registered driver, so as to determine an identity of the current driver.

Further, the MCU 730 may further notify an in-vehicle system of the determined identity of the driver, and the in-vehicle system performs automobile configuration based on a previous habit, hobby, feature, and the like of the driver, for example, perform a series of setting operations (808): setting an angle of a seat in an automobile, a steering wheel control manner, air conditioner temperature, seat heating, an angle of a rearview mirror, multimedia, a Bluetooth device, and navigation, to make the driver drive more safely, comfortably, and at ease.

A hand bone feature of the driver may be entered and stored in advance or registered dynamically. For the latter, the identity recognition apparatus 700 may further provide a registering function, for example, setting a registration mode. When the identity recognition apparatus 700 starts the registration mode, the identity recognition apparatus 700 obtains a feature value of the hand bone of the driver in a manner similar to the foregoing manner, stores the feature value of the hand bone in the memory 740 for subsequent feature comparison. The identity recognition apparatus 700 may further provide more functions, for example, an update function. The driver may dynamically refresh or enrich the feature value in the memory 740, to improve the recognition accuracy.

Before performing digital signal processing (807), the MCU 730 may match the received digital signal with hand bone feature information stored in the memory 740, and if the digital signal conforms to the hand bone feature, perform digital signal processing, so as to avoid a waste of processing resources due to processing a useless signal. In addition to the reflected signal reflected by the hand of the driver, a signal collected by the MIC may further include a direct signal directly obtained from the bone conduction vibrator and some useless signals such as an environmental sound. After these signals are sent to the MCU 730, the MCU 730 needs to perform filtering processing on these signals.

Figure 9:
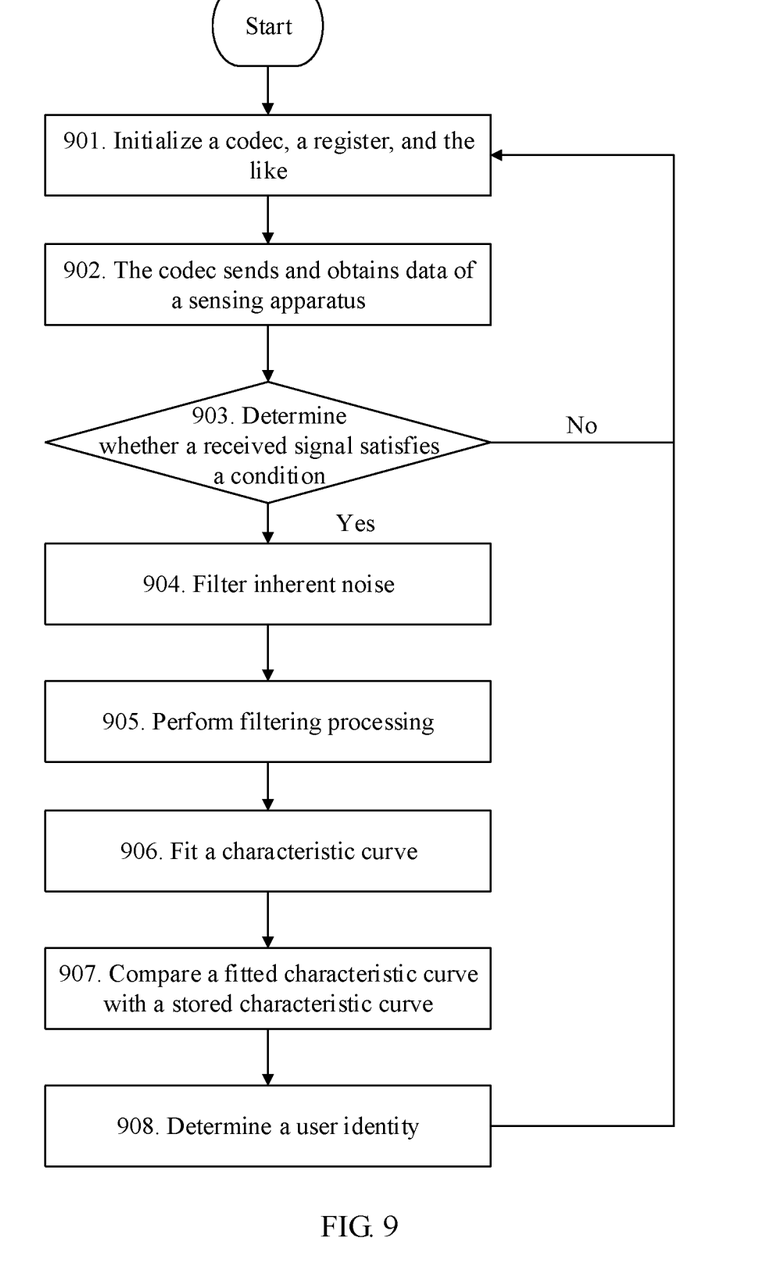
FIG. 9 is a schematic flowchart of a digital signal processing method according to an embodiment of the present invention.

FIG. 9 shows in more details a process of processing a digital signal by an MCU 730 and another related operation.

Step 901. Perform system initialization, including operations such as codec power-on, register initialization, and configuration interrupt.

Step 902. Perform data acquisition. A signal of a specific frequency is sent to a bone conduction vibrator periodically by using the codec, a signal collected by an MIC is obtained by using the codec, and the collected signal is converted to a digital signal, and the digital signal is sent to the MCU.

Step 903. Determine a threshold. The MCU analyzes the received digital signal; determines whether the digital signal meets a hand bone vibration parameter; and if the digital signal does not meet the hand bone vibration parameter, continues to perform signal collection in a feedback initialization stage; or if the digital signal meets the hand bone vibration parameter, stores data of the digital signal, and performs processing of step 804.

Step 904. Perform noise reduction processing. The MCU performs time-domain frequency-domain transformation on inherent frequency noise (other device structure noise such as a sound of a stationary engine), extracts a frequency feature of the inherent noise, and filters out the inherent frequency noise in the collected signal.

Step 905. Perform filtering processing.

(1) The MCU performs digital filtering processing on the collected signal, and transforms the signal to a frequency-domain signal. A frequency-domain signal in an effective area is filtered by using a band-pass filter.

(2) Filter a direct signal. The received signal includes a direct signal and a reflected signal. A signal sent by the bone conduction vibrator enters the MIC directly through structure vibration without passing through a hand bone, and such a signal is referred to as a direct signal. By performing signal sampling in advance and establishing a function model, the direct signal may be filtered out by using a software algorithm. The reflected signal is a useful signal and needs to be stored. A path of the reflected signal is the bone conduction vibrator→the hand bone→the MIC.

In embodiments, by detecting a time difference t between a moment of sending the signal by the bone conduction vibrator and a moment of receiving the signal by the MIC, and then by using $S=v*t$, a path length S of signal transmission may be calculated, where v is a signal transmission rate. In a normal case, a length of the path to which the signal passes through: the bone conduction vibrator→the hand bone→the MIC is approximately 5 mm to approximately 50 mm. If the calculated path length S is within this range, this signal includes a hand bone density signal. In addition, this signal may also be considered as a reflected signal; otherwise, this signal is a direct signal.

Step 906. Fit a characteristic curve. To avoid a feature deviation of single collection, a manner of collecting a reflected signal for a plurality of times is generally used, for example, collecting a reflected signal for two, three, or more times. After performing processing in the foregoing steps on the reflected signals collected for the plurality of times, the reflected signals are transformed to a plurality of curves by using Fourier transform, and the like, and then the plurality of curves are fitted to one curve.

Step 907. Compare the characteristic curve obtained in step 806 with one or more characteristic curves stored in a memory.

A plurality of drivers are allowed to enter feature information of their hands to an identity recognition apparatus. The memory stores a plurality of characteristic curves of the hands of the plurality of drivers, driver identity information and/or automobile configuration information corresponding to each characteristic curve, and the like.

Step 908. Determine an identity corresponding to a curve, with highest similarity to the curve obtained in step 906, in the memory is an identity of a current driver. During similarity determining, a minimum threshold of similarity may be set. If the similarity is less than the minimum threshold, it may be considered that the identity of the driver is invalid.

After determining the identity of the driver, the MCU may further perform corresponding configuration on an automobile. For example, if the driver identity is invalid, the automobile is locked. When the identity of the driver is valid, the MCU may directly configure various parameters of the automobile based on automobile configuration information corresponding to the driver, or the MCU may transmit information about the determined identity to an in-vehicle system, and the in-vehicle system configures various parameters of the automobile based on the identity information.

It can be learned that, according to the automobile provided in the embodiments of the present invention, feature information of a hand of a driver can be conveniently obtained, without requiring the driver to remove glasses for myopia, sunglasses, or a hat or to perform a special action for identity recognition; and the identity of the driver can be recognized based on the feature information of the hand of the driver. Therefore, identity recognition experience of the driver is improved.

In descriptions of the present invention, unless otherwise specified, "a plurality of" refers to two or more than two. "And/or" in this application only describes an association relationship of associated objects and represents that three relationships may exist. For example, A and/or B may represent the following three cases: Only A exists, both A and B exist, and only B exists. In addition, the character "/" in this specification generally indicates an "or" relationship between the associated objects.

The described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided by the present invention, connection relationships between modules indicate that the modules have communication connections with each other, which may be specifically implemented as one or more communications buses or signal cables. A person of ordinary skill in the art may understand and implement the embodiments of the present invention without creative efforts.

Through descriptions of the foregoing implementations, a person skilled in the art may clear understand that the identity recognition method described in the embodiments of the present invention may be implemented by using software plus necessary universal hardware, and certainly, may alternatively be implemented by using specific hardware including an application-specific integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like.

The foregoing descriptions are merely some specific implementations of the present invention, but the protection scope of the present invention is not limited thereto.

What is claimed is:

1. An automobile, comprising:
   a processor; and
   a sensing apparatus;
   wherein the sensing apparatus is installed on a part of the automobile that comes into contact with a hand of a driver, wherein the sensing apparatus comprises a transmitter and a receiver, wherein
   the transmitter is configured to send a sound wave signal to the hand of the driver, and
   the receiver is configured to: receive a reflected sound wave signal reflected by the hand of the driver, convert the reflected sound wave signal to an electrical signal, and send the electrical signal to the processor, and
   wherein the sensing apparatus further comprises a shock-absorbing component, wherein the transmitter and the receiver are both disposed under the shock absorbing component within the part of the automobile and the shock absorbing component is disposed between the hand of the driver and the transmitter and the receiver, and the shock-absorbing component is configured to reduce a sound wave signal transmitted by the transmitter to a rigid area of the part of the automobile; and
   wherein the processor is configured to: receive the electrical signal, analyze the electrical signal to obtain a feature of the reflected sound wave signal, and recognize an identity of the driver based on the feature of the reflected sound wave signal.

2. The automobile according to claim 1, wherein the processor is configured to: compare the obtained feature of the reflected sound wave signal with a pre-stored feature of the hand of the driver, and determine the identity of the driver based on a comparison result.

3. The automobile according to claim 1, further comprising a codec, wherein:
   the receiver is configured to send the electrical signal to the codec; and
   the codec is configured to: encode the electrical signal into a digital signal, and send the digital signal to the processor.

4. The automobile according to claim 1, wherein the part that comes into contact with the hand of the driver is a steering wheel of the automobile or a door handle of the automobile.

5. The automobile according to claim 4, comprising a plurality of sensing apparatuses, wherein the plurality of sensing apparatuses are evenly arranged around an outer side of the steering wheel of the automobile, and a spacing between any two adjacent sensing apparatuses is less than or equal to a preset palm width.

6. The automobile according to claim 1, wherein the processor is configured to: receive the electrical signal, and perform the analysis when determining that the electrical signal meets a hand bone vibration parameter.

7. The automobile according to claim 1, wherein when analyzing the electrical signal to obtain the feature of the reflected sound wave signal, the processor performs digital filtering processing to filter a useless signal, and the useless signal comprises a signal that is directly sent from the transmitter to the receiver without being reflected by the hand of the driver.

8. The automobile according to claim 1, wherein the processor is configured to: when the obtained feature of the reflected sound wave signal matches the pre-stored feature of the hand of the driver, determine operation information associated with the matched pre-stored feature of the hand of the driver, and configure the automobile based on the operation information.

9. A driver identity recognition method, applied to an automobile on which a sensing apparatus and a processor are installed, wherein the method comprises:
   sending, by a transmitter of the sensing apparatus, a sound wave signal to a hand of a driver;
   receiving, by a receiver of the sensing apparatus, a reflected sound wave signal reflected by the hand of the driver, converting the reflected sound wave signal to an electrical signal, and sending the electrical signal to the processor, wherein the sensing apparatus comprises a shock-absorbing component, wherein the transmitter and the receiver are both disposed under the shock absorbing component within a part of the automobile to which the sensing apparatus is installed, the shock absorbing component is disposed between the hand of the driver and the transmitter and the receiver, and the shock-absorbing component is configured to reduce a sound wave signal transmitted by the transmitter to a rigid area of the steering wheel; and analyzing, by the processor, the electrical signal to obtain a feature of the reflected sound wave signal, and recognizing an identity of the driver based on the feature of the reflected sound wave signal.

10. The method according to claim 9, wherein the sending, by the receiver of the sensing apparatus, the electrical signal to the processor comprises:

sending, by the receiver of the sensing apparatus, the electrical signal to a codec, and sending the electrical signal to the processor using the codec, wherein the codec is configured to: encode the electrical signal into a digital signal, and send the digital signal to the processor.

11. A steering wheel, comprising:

at least one sensing apparatus disposed on the steering wheel, wherein the at least one sensing apparatus comprises a transmitter and a receiver, the transmitter is configured to send a sound wave signal to a hand of a driver, and the receiver is configured to: receive a reflected sound wave signal reflected by the hand of the driver, convert the reflected sound wave signal to an electrical signal, and send the electrical signal to the processor, wherein the sensing apparatus further comprises a shock-absorbing component, wherein the transmitter and the receiver are both disposed under the shock absorbing component within the steering wheel and the shock absorbing components is disposed between the hand of the driver and the transmitter and the receiver, and the shock-absorbing component is configured to reduce a sound wave signal transmitted by the transmitter to a rigid area of the steering wheel.

12. The steering wheel according to claim 11, wherein the receiver is configured to: send the electrical signal to a codec, and send the electrical signal to the processor using the codec, wherein the codec is configured to: encode the electrical signal into a digital signal, and send the digital signal to the processor.

13. The steering wheel according to claim 11, wherein the at least one sensing apparatus comprises a plurality of sensing apparatuses, the plurality of sensing apparatuses are evenly arranged arranged around an outer side of the steering wheel, and a spacing between any two sensing apparatuses is less than or equal to a preset palm width.

14. The steering wheel according to claim 11, wherein the processor is installed inside a central shaft of the steering wheel; and the processor is configured to: analyze the electrical signal to obtain a feature of the reflected sound wave signal, and recognize an identity of the driver based on the feature of the reflected sound wave signal.

\* \* \* \* \*